(12) United States Patent
Louven et al.

(10) Patent No.: US 9,309,859 B2
(45) Date of Patent: Apr. 12, 2016

(54) METHOD FOR CONTROLLING AN IGNITION SYSTEM OF AN INTERNAL COMBUSTION ENGINE AND AN IGNITION SYSTEM

(71) Applicant: Ford Global Technologies, LLC, Dearborn, MI (US)

(72) Inventors: Georg Louven, Neuwied (DE); Klemens Grieser, Langenfeld (DE); Kay Hohenboeken, Cologne (DE); Oliver Berkemeier, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 13/966,653

(22) Filed: Aug. 14, 2013

(65) Prior Publication Data

US 2014/0048039 A1 Feb. 20, 2014

(30) Foreign Application Priority Data

Aug. 15, 2012 (DE) .......................... 10 2012 214 518

(51) Int. Cl.
*F02P 17/12* (2006.01)
*F02P 17/04* (2006.01)
(Continued)

(52) U.S. Cl.
CPC ................. *F02P 17/12* (2013.01); *F02D 41/00* (2013.01); *F02P 5/151* (2013.01); *F02P 5/152* (2013.01); *F02P 5/1502* (2013.01); *F02P 5/1512* (2013.01); *F02P 17/04* (2013.01); *F02D 35/027* (2013.01); *F02D 41/2438* (2013.01);
(Continued)

(58) Field of Classification Search
CPC ......... F02P 5/152; F02P 5/1502; F02P 17/04; F02P 17/12; F02D 35/027
USPC ............. 123/406.12, 406.14, 406.16, 406.21, 123/406.29, 406.37, 609; 701/111, 113
See application file for complete search history.

(56) References Cited

U.S. PATENT DOCUMENTS 4,440,141 A * 4/1984 Tsujimura et al. ............ 123/609
4,711,212 A * 12/1987 Haraguchi et al. ....... 123/406.38
(Continued)

FOREIGN PATENT DOCUMENTS

| DE | 3022993 A1 * | 1/1982 |
| DE | 102006010807 A1 | 9/2007 |
| EP | 0640761 A2 | 3/1995 |
| JP | 2011140889 A * | 7/2011 |
| WO | 0134972 A1 | 5/2001 |

*Primary Examiner* — Mahmoud Gimie
(74) *Attorney, Agent, or Firm* — Julia Voutyras; Alleman Hall McCoy Russell & Tuttle LLP

(57) ABSTRACT

A method for controlling an ignition system of an internal combustion engine, with which a device for the detection of misfires is provided, comprises operation of the internal combustion engine in a calibration mode, wherein the calibration mode includes stepwise reduction of the ignition energy by changing the ignition parameter starting from an initial value, detecting the reaching of a combustion failure limit based on the signal of the detection device and again reducing the ignition energy if the combustion failure limit has not yet been reached, and storing the ignition parameter at the point in time of reaching the combustion failure limit. When not in the calibration mode, operation of the ignition system takes place according to the stored ignition parameter. With such feedback control, electrode burn of the spark plugs is reduced, leading to an extension of the service life of the spark plugs.

20 Claims, 3 Drawing Sheets

(51) Int. Cl.
*F02D 41/00* (2006.01)
*F02P 5/15* (2006.01)
*F02P 5/152* (2006.01)
*F02D 35/02* (2006.01)
*F02D 41/24* (2006.01)

(52) U.S. Cl.
CPC .... *F02D 41/2464* (2013.01); *F02D 2200/1015* (2013.01); *Y02T 10/46* (2013.01)

(56) References Cited

U.S. PATENT DOCUMENTS

| | | | |
|---|---|---|---|
| 5,513,620 | A | 5/1996 | Pyko et al. |
| 7,403,847 | B2 * | 7/2008 | Matsuda et al. ............... 701/54 |
| 2001/0002590 | A1 * | 6/2001 | Cianciara et al. .......... 123/406.2 |
| 2003/0089353 | A1 * | 5/2003 | Gerhardt et al. ............... 123/609 |
| 2013/0340512 | A1 * | 12/2013 | Horlbeck et al. .......... 73/114.02 |

* cited by examiner

METHOD FOR CONTROLLING AN IGNITION SYSTEM OF AN INTERNAL COMBUSTION ENGINE AND AN IGNITION SYSTEM

CROSS-REFERENCE TO RELATED APPLICATIONS

The present application claims priority to German Patent Application No. 102012214518.4, filed on Aug. 15, 2012, the entire contents of which are hereby incorporated by reference for all purposes.

FIELD

The application relates to a method for controlling an ignition system of an internal combustion engine and an ignition system for performing the method.

BACKGROUND AND SUMMARY

A criterion for the economics of motor vehicles is the frequency of the necessary maintenance intervals. In order to reduce costs and in view of the tendency towards long warranty periods, the trend for modern motor vehicles is towards very long maintenance intervals. For an electronically controlled spark ignition system the maintenance interval is significantly influenced by spark plug wear. The failure of a spark plug occurs in particular through electrode burn and electrode gap widening caused by pressure conditions. Said electrode burn increases significantly with the ignition energy applied per ignition process.

In order to extend the typical service life of spark plugs, e.g. in respect of a mileage of more than 100 000 km, it is known from EP 0 640 761 A2 to vary the ignition energy, i.e. the spark ignition current and the spark burn time, depending on various engine parameters so that the ignition energy is minimized in each case depending on said engine operating conditions and hence the electrode burn is reduced. The adjustment of the ignition parameter takes place by means of an engine parameter-dependent characteristic field for the known ignition system.

Because spark plugs in practice are relatively different in their ignition behavior depending on their actual condition (e.g. sooting) and the combustion processes are subject to a certain degree of random variation, the ignition energy is typically selected to be so high for known ignition systems that misfires are prevented under all conceivable boundary conditions.

The reduction of electrode burn achievable with a known ignition system is thus limited.

Accordingly, it is possible in some examples to provide a method for controlling an ignition system and an ignition system for implementing the method, with which the service life of the spark plugs can be increased further to the greatest extent without additional design effort and with the same ignition reliability.

This can be achieved by controlling the ignition system of an internal combustion engine having at least one cylinder with spark ignition, with which an ignition parameter influencing the ignition energy can be controlled, and with which a device for detection of misfires is provided, operation of the internal combustion engine in a calibration mode is provided, wherein the calibration mode comprises the following steps:

a) stepwise reduction of the ignition energy by changing the ignition parameter starting from an initial value, b) detecting the reaching of a combustion failure limit based on the signal of the detection device and further reduction of the ignition energy if the combustion failure limit has not yet been reached, and c) storing the ignition parameter at the point in time of reaching the combustion failure limit, in some embodiments taking into account an operating offset value.

The method also comprises the operation of the ignition system on the basis of the stored ignition parameter when not in the calibration mode.

DETAILED DESCRIPTION

In contrast to other ignition systems, with the method described in examples herein, ignition power may be adapted to the actual ignition characteristics of the spark plug. This is determined in the calibration mode described by successively reducing the ignition parameter and observing the combustion behavior of the engine in response to said variation. Finally, the ignition parameter may thereby be optimized within the context of a feedback control loop operating at least temporarily during the calibration mode.

The ignition parameter determined in this way may be stored, and in some embodiments, may be stored taking into account an operating offset value. A certain safety margin may be specified with the operating offset value, which may be taken into account additively, so that the ignition can take place reliably above the combustion failure limit. The required operating offset value is however significantly lower than the required safety margin for a purely characteristic field solution according to other ignition systems. As an alternative to storing the ignition parameter with additive accounting for an operating offset value, such an operating offset value can clearly also be taken into account for the first time in subsequent engine operation.

Figure 1:
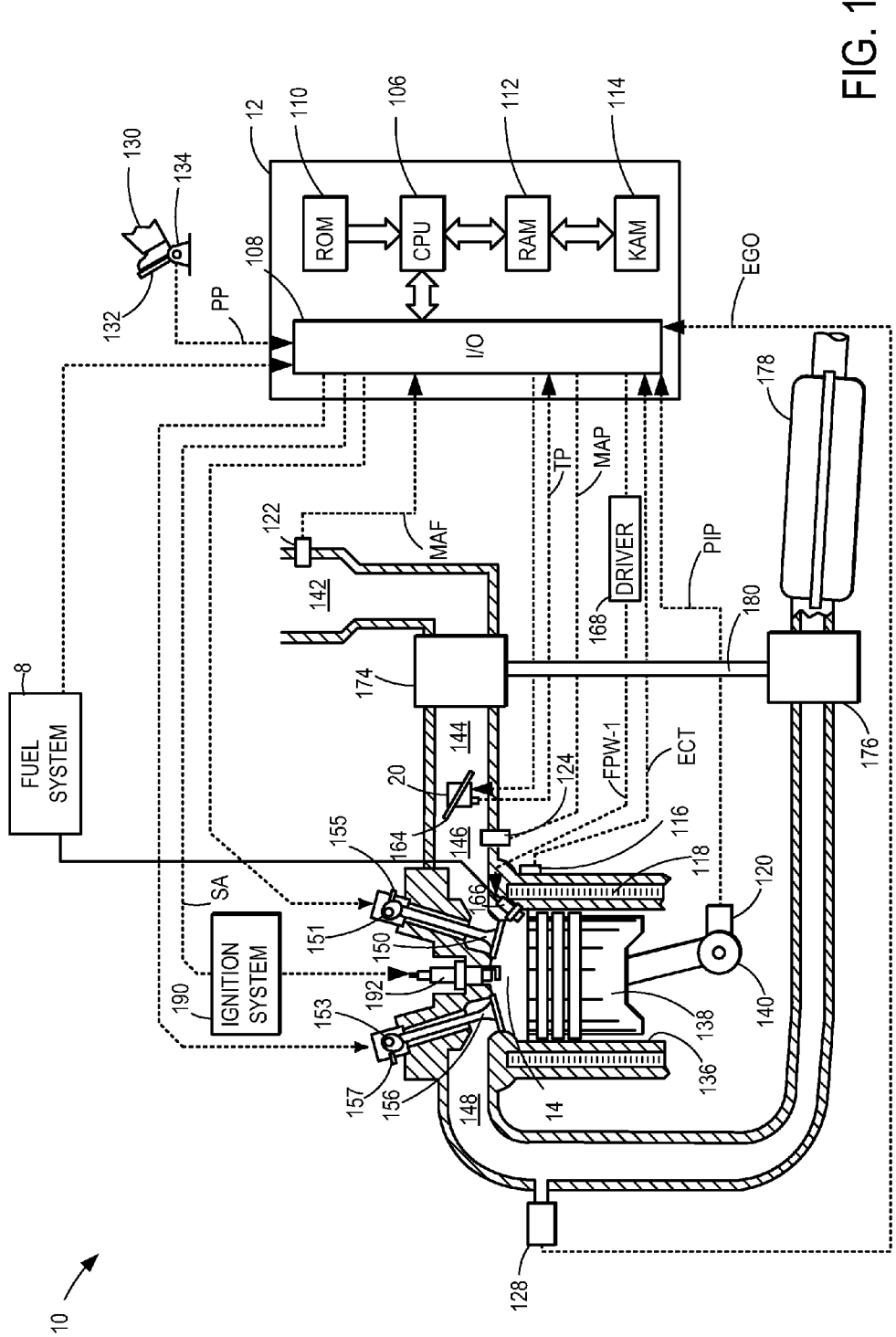
FIG. 1 shows a schematic diagram of a combustion chamber operating with an ignition system.

FIG. 1 depicts an example embodiment of a combustion chamber or cylinder of internal combustion engine 10. In one example, engine 10 may be a turbocharged engine. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc.

While not shown, it will be appreciated that engine 10 may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emission. The one or more EGR passages may include a low pressure (LP)-EGR passage coupled between the engine intake upstream of the turbocharger compressor and the engine exhaust downstream of the turbine, and configured to provide LP-EGR. The one or more EGR passages may further include a high pressure (HP)-EGR passage coupled between the engine intake downstream of the compressor and the engine exhaust upstream of the turbine, and configured to provide HP-EGR. In one example, an HP-EGR flow may be provided under conditions such as the absence of boost provided by the turbocharger, while an LP-EGR flow may be provided during conditions such as the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for storing executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 2:
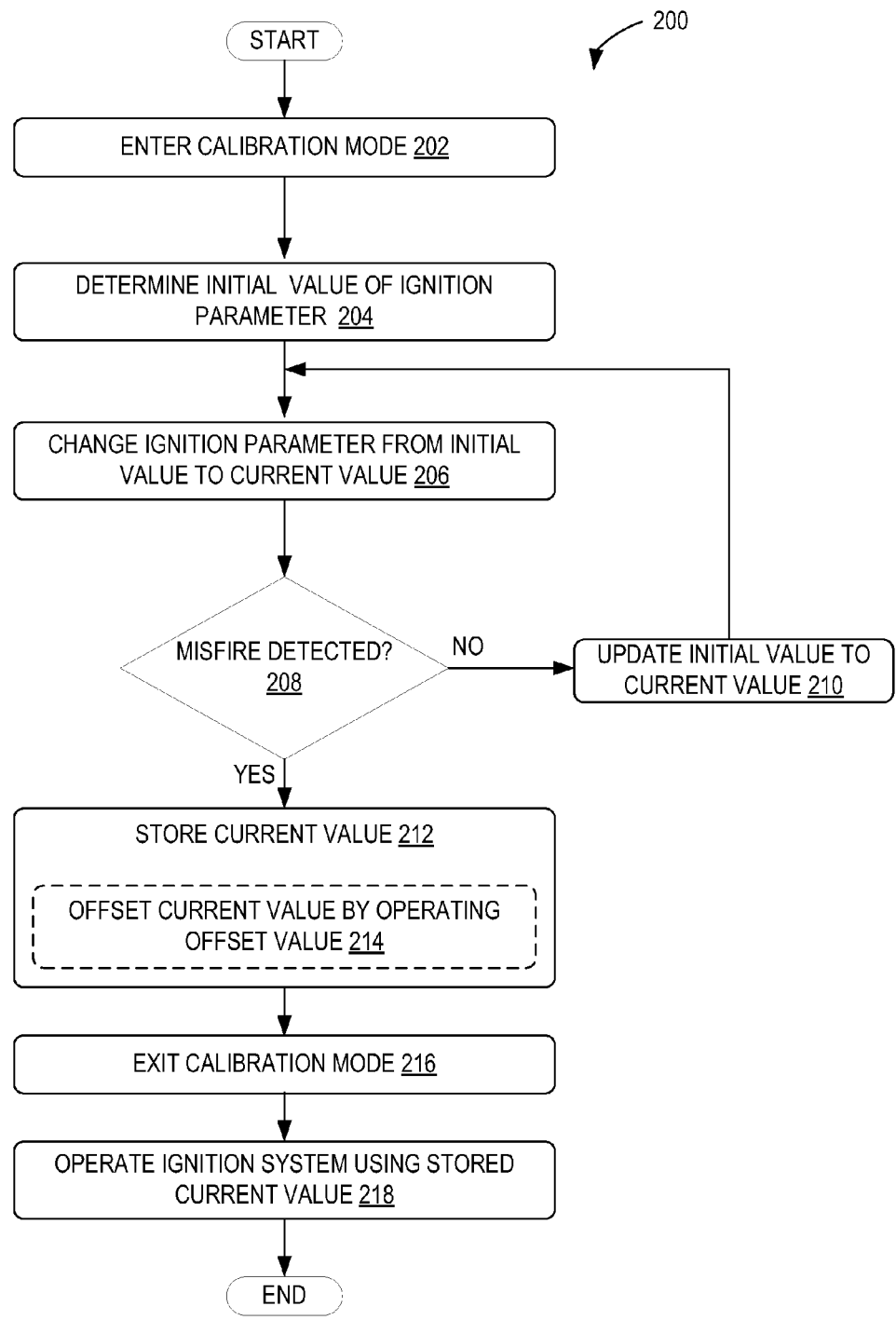
FIG. 2 shows an example method for operating the ignition system to obtain a minimum stable value for an ignition parameter.

FIG. 2 is a flow chart of a method 200 of operating an ignition system of an internal combustion engine to determine an ignition parameter that provides a minimum amount of ignition energy for a given operating condition of the engine. The method 200 includes entering a calibration mode at 202 and determining an initial value of the ignition parameter at 204. In order to determine a smallest stable value (e.g., value that does not result in misfire) for the ignition parameter, the ignition parameter is stepwise reduced by being changed from the initial value to a current value, as indicated at 206. In one example, the stepwise reduction includes reducing the ignition parameter by a preset amount, in one step at a time, and holding the parameter in between the stepwise reductions, with each duration of the hold equal to each other duration, and each amount of reduction equal to each other reduction at other steps of the stepwise reduction. At 208, it is determined whether a misfire is detected. If no misfire is detected, the initial value is updated to equal the current value at 210, and the method returns to step 206 to change the updated initial value to a new current value. If misfire is detected, then the current value is stored at 212. Since the current value resulted in a misfire, the current value may be offset by an operating offset at 214 in order to ensure that future operation may be performed without risk of misfire. At 216, the method 200 includes exiting the calibration mode. Upon exiting the calibration mode, the ignition system is operated using the stored ignition parameter, as indicated at 218.

In some embodiments of the method, storing the ignition parameter in a characteristic field may take place depending on various engine operating parameters, such as the engine revolution rate, the engine load and/or the engine temperature. Moreover, further parameter dependencies may be utilized, e.g. depending on the previous operating time of the spark plugs, the current fuel-air ratio, the engine operating mode (lean burn), etc. The characteristic field storage takes place with division of the individual parameters in certain value ranges, wherein the breadth of the value ranges is selected to be greater or smaller depending on the variation of the ignition parameter in said parameter range, so that overall a finite, not too high number of characteristic field points may thereby be determined. In order to avoid discontinuities and parameter steps, the characteristic field values can be linearly interpolated between the specified points in some examples.

By the characteristic field dependent storage of the individually calibrated ignition parameters, the fact that the required minimum ignition energy changes depending on the engine operating parameters in a different manner depending on the respective qualities of the spark plug can be taken into account.

Furthermore, in some embodiments of the method, it is provided that the calibration may be carried out individually for each cylinder of the multi-cylinder internal combustion engine and thus for each spark plug. Thus the respective state of the individual spark plugs may likewise be taken into account. The calibration of all cylinders may take place during a common procedure in calibration mode. The calibration and/or calibration mode may end when the respective combustion failure limit has been detected for all cylinders. A cylinder-selective closure time adjustment may also be made thereby, as long as one ignition coil is used per spark plug or cylinder.

The ignition parameter used within the scope of the present application for influencing the ignition energy can be the dwell time. The dwell time is a characteristic variable of spark ignition systems, which for conventional mechanical ignition systems and simple electronic ignition systems corresponds to the charging time of the ignition coil, also referred to herein as the closing time (or, in relation to the crankshaft, the closing angle) of the ignition contact. By the time-delayed build-up of the magnetic field in the ignition coil, said closing time for such ignition systems is a direct measure of the charged ignition energy and of the ignition energy flowing out via the ignition spark when the ignition circuit is opened. For developed ignition systems the inductivity of the ignition coil is reduced by various measures, so that saturation of the ignition coil takes place very rapidly. In this case control of the ignition energy can take place during the ignition process, e.g. by means of controlling the ignition current. For such an ignition system, as is known e.g. from EP 0 640 761 A2, e.g. the ignition current would be controlled as the ignition parameter.

A crankshaft angle sensor may be used for the detection of misfires in embodiments of the method. Such a sensor is already provided in modern internal combustion engines for controlling the combustion timings and for the detection of combustion irregularities independently of the present method according to one or more embodiments, so that no additional sensor system is required in one example. The detection of misfires takes place as known using the angular speed fluctuations associated with misfires.

Alternatively, other detection methods are also conceivable however, such as the acoustic or optical monitoring of the combustions or the detection of a combustion-related ionization current through the spark plug.

In some embodiments, the calibration mode can be activated following a certain number of operating hours of the internal combustion engine, e.g. every ten operating hours. In addition, a calibration may also be triggered following the detection of ignition problems or after inspections (e.g. detectable from the resetting of the maintenance timer) in order to immediately take account of any replaced spark plugs.

In order to shorten the calibration process, it is provided that the initial value of the ignition parameter at the start of the calibration process corresponds to the last stored ignition parameter, wherein a specified calibration offset value is allowed for to take into account drift that has occurred in the meantime. Said calibration offset value corresponds to the anticipated maximum deviation of the ignition parameter between individual calibration processes and does not have to be identical to the previously mentioned operating offset value.

Said calibration offset value likewise allows a conclusion to be drawn about the service life of the spark plug or spark plugs. Thus an individual service life of the spark plug can be determined, depending on the usage profile. This can be used as information for the driver, e.g. by means of a request for a plug change via a control lamp or an indication in a display.

On commissioning the engine controller, conservative values for the ignition parameters are specified ex works, which can then be successively individually calibrated and thus optimized—for example, depending on engine parameters—during operation of the vehicle.

In order to take into account particularly stable or unstable engine operating states in terms of the ignition characteristics, it can also be provided that the operating offset value, i.e. the safety margin, is varied when operating the engine towards the combustion failure limit, likewise depending on optional engine operating parameters. These can be e.g. the engine revolution rate, the engine load, and/or the engine temperature. Said variable operating offset value can either be taken into account during calibration and can be taken into account directly additively or subtractively in the characteristic field, or alternatively can be taken into account during subsequent engine operation.

With the method, feedback control of the ignition energy is achieved, so that electrode burn is reduced and thus the typical service life of the spark plugs can be increased to lie in the range greater than 100 000 km.

The method according to an embodiment is explained in detail below using the flow diagram shown in FIG. 3 as an example.

Figure 3:
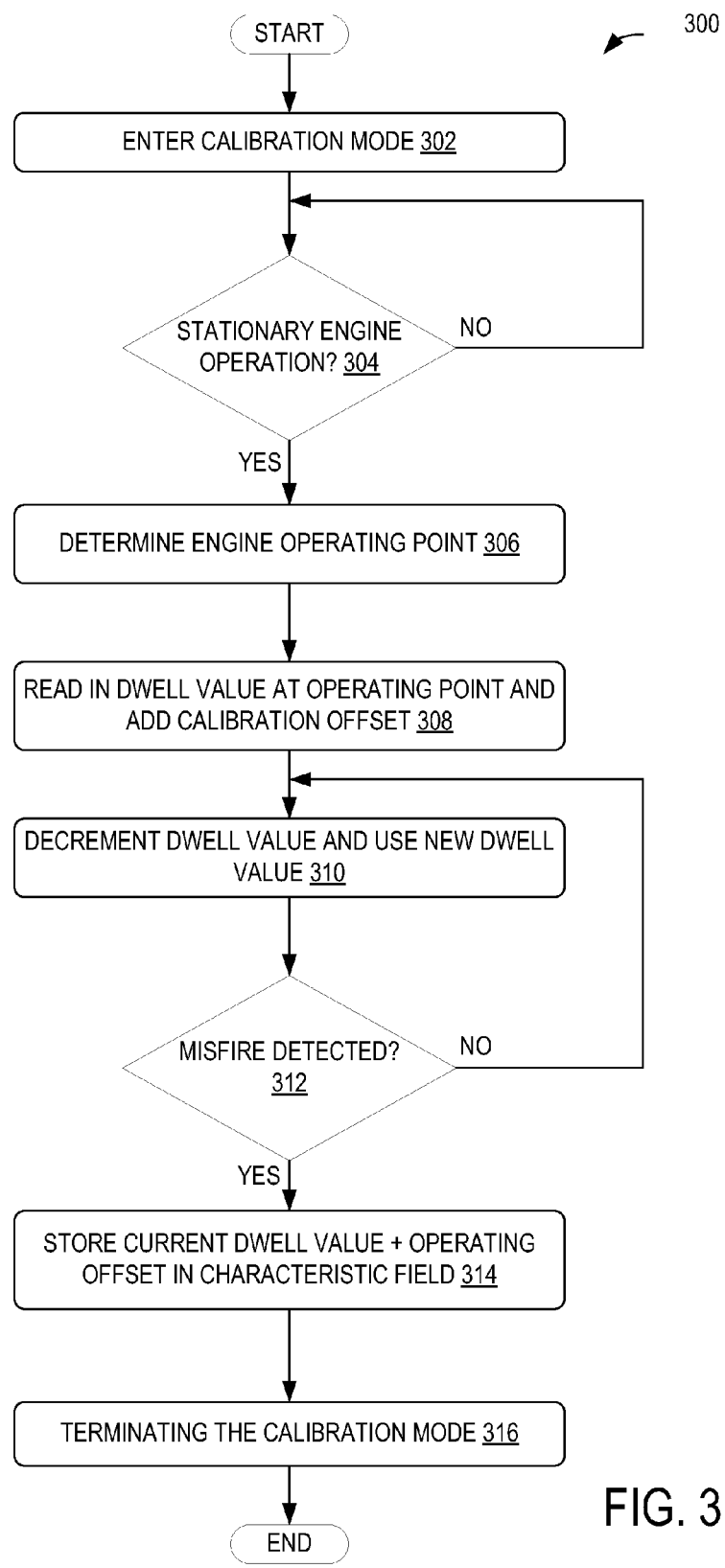
FIG. 3 shows an example method for operating the ignition system to obtain a minimum stable dwell value for the ignition system.

FIG. 3 shows a flow diagram with an example algorithm 300 for implementing the method. The algorithm shown may be varied in respect of the order of the steps—as long as this is appropriate—and can be expanded with further steps. Further, steps that are not necessarily required can be omitted.

The implementation of the algorithm takes place via a normal microprocessor controlled engine controller, which contains an electronic ignition controller, in which the ignition energy for each individual cylinder can be influenced by a dwell time. A longer dwell time corresponds here—at least within defined limits—to higher ignition energy. Depending on the ignition circuit, a different ignition energy-relevant variable can also be alternatively regulated. For example, the ignition current can be interrupted after the flow of energy at a limit value specified by the ignition parameter through a power semiconductor.

At regular intervals, e.g. in each case after ten hours of engine operating time, a transition from normal engine operation into a calibration mode may take place, as indicated in Step 302. Here it is first determined in Query 304 whether the engine is in a stationary operating state, i.e. whether the revolution rate variation and the load variation per time unit lie below a certain threshold value. If this is not the case, the system waits for the actual calibration mode, wherein normal operation of the internal combustion engine is of course continued.

At step 306, if stationary engine operation is detected, then it is determined, using engine operating parameters such as engine revolution rate, engine load or engine temperature, at which operating point of a characteristic field the internal combustion engine is actually being operated.

The ignition parameter value at this operating point predetermined from the preceding calibration, or for a first calibration the ignition parameter value predetermined ex works for said operating state, is then read in (Step 308). In doing this a calibration offset value is added or subtracted, with which the starting point for the calibration process is defined. Said calibration offset value can in principle also be zero.

Thereupon the calibration process takes place by iteratively decrementing the dwell value, i.e. reducing the ignition energy, and operating the internal combustion engine with the dwell value obtained in this way for at least one combustion cycle (Step 310).

It is then queried whether a misfire has occurred (Query 312). For this purpose the angular speed of a high resolution crankshaft sensor is evaluated. If no misfire is still detected, the dwell value is further decremented until finally a misfire is detected.

Alternatively, the dwell value can also be limited to a specified lower limit (not shown), at which the process is terminated, if—for whatever reason—no misfire has still been detected even at minimal ignition energy. For example, if the dwell value reaches a threshold minimum value and no misfire is detected, the system may exit the calibration mode and store the current dwell value (e.g., the threshold minimum value).

Furthermore, it is possible in a (not shown) variation of the method that multiple successive misfires have to be detected, so that this is recognized as a combustion failure limit in order to detect the combustion failure limit particularly reliably.

With detection of the combustion failure limit in Step 312, storage of the current dwell value in the characteristic field at the current engine operating parameter point takes place in Step 314, wherein an operating offset is added as the safety margin, which in turn can be dependent on the engine operating conditions.

Alternatively, it is clearly also possible to deposit the determined ignition operating parameter values in the characteristic field initially without taking into account an offset and then to take into account a suitable offset subsequently during operation of the engine.

The calibration mode is thus terminated for the current engine operating point (Step 316). Engine operation under the operating conditions forming the basis of calibration takes place from then on taking into account the cylinder-specific ignition parameter value stored in the characteristic field until re-calibration is carried out at the respective engine operating point.

The calibration mode is then preferably also carried out for other engine operating points. This can e.g. be controlled so that for each engine operating point there is a separate semaphore (or flag) in the memory that shows whether a calibration has already been carried out for this point in the current calibration mode. The calibration then waits in total until a calibration has been carried out for all points, i.e. all desired operating points must be transitioned once in the stationary state.

In order to keep the elapsed time within bounds here, the number of operating points to be calibrated is kept relatively small and known engine parameter-dependent changes of the combustion failure limit may be taken into account by variable adaptation of the operating offset values.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The invention claimed is:

1. A method for controlling a spark ignition system of an internal combustion engine having at least one cylinder with spark ignition, with which a spark ignition parameter influencing spark ignition energy can be controlled, and with which a device for detection of misfires is provided, the method comprising:
operating the internal combustion engine in a calibration mode, wherein the calibration mode comprises:
stepwise reduction of the spark ignition energy by changing the spark ignition parameter starting from an initial value,
detecting when a combustion failure limit is reached based on a signal of the detection device and again reducing the spark ignition energy if the combustion failure limit has not yet been reached, and
storing the spark ignition parameter at a point in time of reaching the combustion failure limit; and
exiting the calibration mode and operating the spark ignition system in accordance with the stored spark ignition parameter.

2. The method as claimed in claim 1, wherein the storage of the spark ignition parameter in a characteristic field is carried out depending on various engine operating parameters, especially depending on engine revolution rate, engine load, and/or engine temperature.

3. The method as claimed in claim 1, wherein calibration is carried out for each cylinder of a multi-cylinder internal combustion engine individually during a common operation in the calibration mode, which continues until misfire limits have been detected for all cylinders.

4. The method as claimed in claim 1, wherein the spark ignition parameter influencing the spark ignition energy is dwell time.

5. The method as claimed in claim 1, wherein the device for the detection of misfires comprises a high resolution crankshaft angle sensor.

6. The method as claimed in claim 1, wherein the calibration mode is activated in each case following a specified number of operating hours of the internal combustion engine.

7. The method as claimed in claim 1, wherein the initial value of the spark ignition parameter at the start of the calibration mode corresponds to a last stored spark ignition parameter, corrected by a calibration offset value.

8. The method as claimed in claim 1, wherein storing the spark ignition parameter comprise offsetting the spark ignition parameter by an operating offset value, the operating offset value being varied depending on engine operating parameters present in each case, especially depending on engine revolution rate, engine load, and/or engine temperature.

9. An internal combustion engine system comprising:
a spark ignition system including a device for detection of misfires;
and
a controller configured to:
operate an internal combustion engine in a calibration mode, including controlling the spark ignition system to:
perform stepwise reduction of spark ignition energy by changing a spark ignition parameter starting from an initial value,
detect when a combustion failure limit is reached based on a signal of the detection device and again reducing the spark ignition energy if the combustion failure limit has not yet been reached, and
store the spark ignition parameter at a point in time of reaching the combustion failure limit, selectively taking into account an operating offset value; and
exit the calibration mode and operate the spark ignition system on the basis of the stored ignition parameter.

10. The internal combustion engine system of claim 9, wherein the device for the detection of misfires comprises a high resolution crankshaft angle sensor.

11. The internal combustion engine system of claim 9, further comprising one or more sensors for measuring engine operating parameters including one or more of engine revolution rate, engine load, and engine temperature.

12. The internal combustion engine system of claim 11, wherein the operating offset value is varied depending on at least one of the engine operating parameters measured by the one or more sensors.

13. A method of controlling a spark ignition system of an engine, the method comprising:
operating the engine in a calibration mode, including:
performing a stepwise reduction of spark ignition energy by changing a spark ignition parameter from an initial value to a current value;
determining whether misfire is detected after each step-change to the spark ignition parameter; and
storing the current value and exiting the calibration mode responsive to detecting misfire.

14. The method of claim 13, wherein the calibration mode further includes updating the initial value to the current value and changing the spark ignition parameter from the updated initial value to a new current value responsive to not detecting misfire.

15. The method of claim 13, wherein storing the current value further comprises offsetting the current value by an operating offset value to produce an offset current value and storing the offset current value.

16. The method of claim 15, wherein the operating offset value is determined based upon one or more engine operating parameters, including at least one of engine revolution rate, engine load, and engine temperature.

17. The method of claim 13, further comprising operating the spark ignition system in accordance with the stored spark ignition parameter responsive to exiting the calibration mode.

18. The method of claim 13, further comprising offsetting the initial value by a calibration offset.

19. The method of claim 18, wherein the calibration offset corresponds to an anticipated maximum deviation of the spark ignition parameter between individual calibration processes.

20. The method of claim 13, further comprising exiting the calibration mode and storing the current value responsive to determining that the current value is at a threshold.

* * * * *